US 8,251,681 B2

(12) United States Patent
Tsai et al.

(10) Patent No.: US 8,251,681 B2
(45) Date of Patent: Aug. 28, 2012

(54) FAN AND MOTOR THEREOF

(75) Inventors: Shui-Fa Tsai, Taoyuan Hsien (TW);
Hung-Yi Liang, Taoyuan Hsien (TW);
Hou-Chu Chen, Taoyuan Hsien (TW);
Chin-Chu Hsu, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 926 days.

(21) Appl. No.: 12/256,878

(22) Filed: Oct. 23, 2008

(65) Prior Publication Data
US 2009/0169403 A1 Jul. 2, 2009

(30) Foreign Application Priority Data

Dec. 26, 2007 (TW) .............................. 96150237 A

(51) Int. Cl.
*F04D 25/06* (2006.01)
*H02K 1/14* (2006.01)
*H02K 1/27* (2006.01)

(52) U.S. Cl. ................. 417/423.7; 310/216; 310/156.38
(58) Field of Classification Search ............... 417/423.7; 310/216, 156.38, 154.45; 416/24 R, 1
See application file for complete search history.

(56) References Cited

U.S. PATENT DOCUMENTS

| 2003/0124001 | A1* | 7/2003 | Chen ............................ 417/356 |
| 2005/0058559 | A1* | 3/2005 | Kasahara et al. .......... 417/423.7 |

FOREIGN PATENT DOCUMENTS

| CN | 2306352 Y | * | 6/1997 |
| CN | 2306352 | | 2/1999 |
| CN | 2599289 | | 1/2004 |
| CN | 101058224 | | 10/2007 |
| TW | M241521 | | 8/2004 |
| TW | 200644384 | | 12/2006 |

* cited by examiner

*Primary Examiner* — Anh Mai
*Assistant Examiner* — Elmito Breval
(74) *Attorney, Agent, or Firm* — Muncy, Geissler, Olds & Lowe, PLLC

(57) ABSTRACT

A motor includes a rotor magnetic ring, a stator core, a first magnetic conducting sheet and a second magnetic conducting sheet. The stator core is disposed around and out of the rotor magnetic ring. The first magnetic conducting sheet has a ring shape with a protruding portion serving as a first magnetic pole. The second magnetic conducting sheet has a ring shape with a protruding portion serving as a second magnetic pole. The first magnetic conducting sheet is disposed at the upper side of the stator core, and the second magnetic conducting sheet is disposed at the lower side of the stator core. The projections of the first and second magnetic poles alternate with each other. A fan including the motor is also disclosed.

20 Claims, 4 Drawing Sheets

FAN AND MOTOR THEREOF

CROSS REFERENCE TO RELATED APPLICATIONS

This Non-provisional application claims priority under 35 U.S.C. §119(a) on Patent Application No(s). 096150237, filed in Taiwan, Republic of China on Dec. 26, 2007, the entire contents of which are hereby incorporated by reference.

BACKGROUND OF THE INVENTION

1. Field of Invention

The present invention relates to a fan and a motor thereof, and in particular to a fan and an inner-rotor motor thereof.

2. Related Art

In the trend of miniaturizing current fan applied to electronic apparatus or system, it is necessary to enhance the heat dissipation efficiency of the fan within the limited volume. To achieve this goal, it is an applicable way to adjust the size of the blade of the fan.

Generally speaking, according to the dispositions of the rotor and stator, the motor of the fan is divided into an outer-rotor motor and an inner-rotor motor. Referring to FIG. 1, a conventional fan 1 includes an inner-rotor motor 10 for driving the blades 14 to rotate. The stator of the fan 1 includes several sets of silicon steel sheet 12 and winding 13. Each set of silicon steel sheet 12 and each winding 13 are disposed between the frame 15 and the blades 14, and the notch of the silicon steel sheet 12 occupies a part of the inner space of the frame 15. Thus, the areas of the outlet and inlet of the fan 1 are restricted, and the air flows of the fan 1 are decreased accordingly. In addition, the windings 13 must be wound on the silicon steel sheets 12 respectively, so that the manufacturing costs are high.

SUMMARY OF THE INVENTION

In view of the foregoing, the purpose of the present invention is to provide a fan and a motor thereof that increase the disposable area for the blades of the fan by changing the designs of blades and motor structure, thereby improving the heat dissipation efficiency, simplifying the winding method of the stator, and thus decreasing the manufacturing costs.

To achieve the above, the present invention discloses a motor including a rotor magnetic ring, a stator core, a first magnetic conducting sheet, and a second magnetic conducting sheet. The stator core is disposed around and out of the rotor magnetic ring. The first magnetic conducting sheet has a ring shape with a protruding portion serving as a first magnetic pole. The second magnetic conducting sheet has a ring shape with a protruding portion serving as a second magnetic pole. The first magnetic conducting sheet is disposed at the upper side of the stator core, and the second magnetic conducting sheet is disposed at the lower side of the stator core. The projections of the first and second magnetic poles alternate with each other. In addition, the motor further includes a winding disposed at the inner side or the outer side of the stator core and wound as a concentric circle with respect to an axle of the rotor magnetic ring.

To achieve the above, the present invention also discloses a fan including a frame, a motor and a plurality of blades. The motor is disposed in the frame. The motor has a rotor magnetic ring, a stator core, a first magnetic conducting sheet and a second magnetic conducting sheet. The stator core is disposed around and out of the rotor magnetic ring. The first magnetic conducting sheet has a ring shape with a protruding portion serving as a first magnetic pole. The second magnetic conducting sheet has a ring shape with a protruding portion serving as a second magnetic pole. The first magnetic conducting sheet is disposed at the upper side of the stator core, and the second magnetic conducting sheet is disposed at the lower side of the stator core. The projections of the first and second magnetic poles alternate with each other. The blades are connected to the inner side of the rotor magnetic ring of the motor. In addition, the motor of the fan further includes a winding disposed at the inner side or the outer side of the stator core.

As mentioned above, the fan and motor thereof according to the present invention have the following features. The winding is disposed at the inner side or the outer side of the stator core. The first magnetic conducting sheet and the second magnetic conducting sheet are disposed at two sides of the stator core, respectively. The projections of the magnetic poles of the first and second magnetic conducting sheets alternate with each other. Moreover, the rotor magnetic ring and the blades can be formed by injection molding and are disposed in the stator core, so as to form an inner-rotor motor to drive the fan to rotate. Compared with the prior art, the present invention changes the positions of magnetic poles and winding method of the stator, so that the magnetic poles of the stator are disposed at different planes, respectively, and the projections of the magnetic poles alternate with each other. So as to increase the disposable area for the blades and decrease the occupied area of the stator, and make the space of the frame be used efficiently. In addition, the winding method for the windings is simplified, the winding time is decreased, so as to decrease the assembly time and the manufacturing cost.

BRIEF DESCRIPTION OF THE DRAWINGS

The present invention will be fully understood from the subsequent detailed description and accompanying drawings, which are given by way of illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
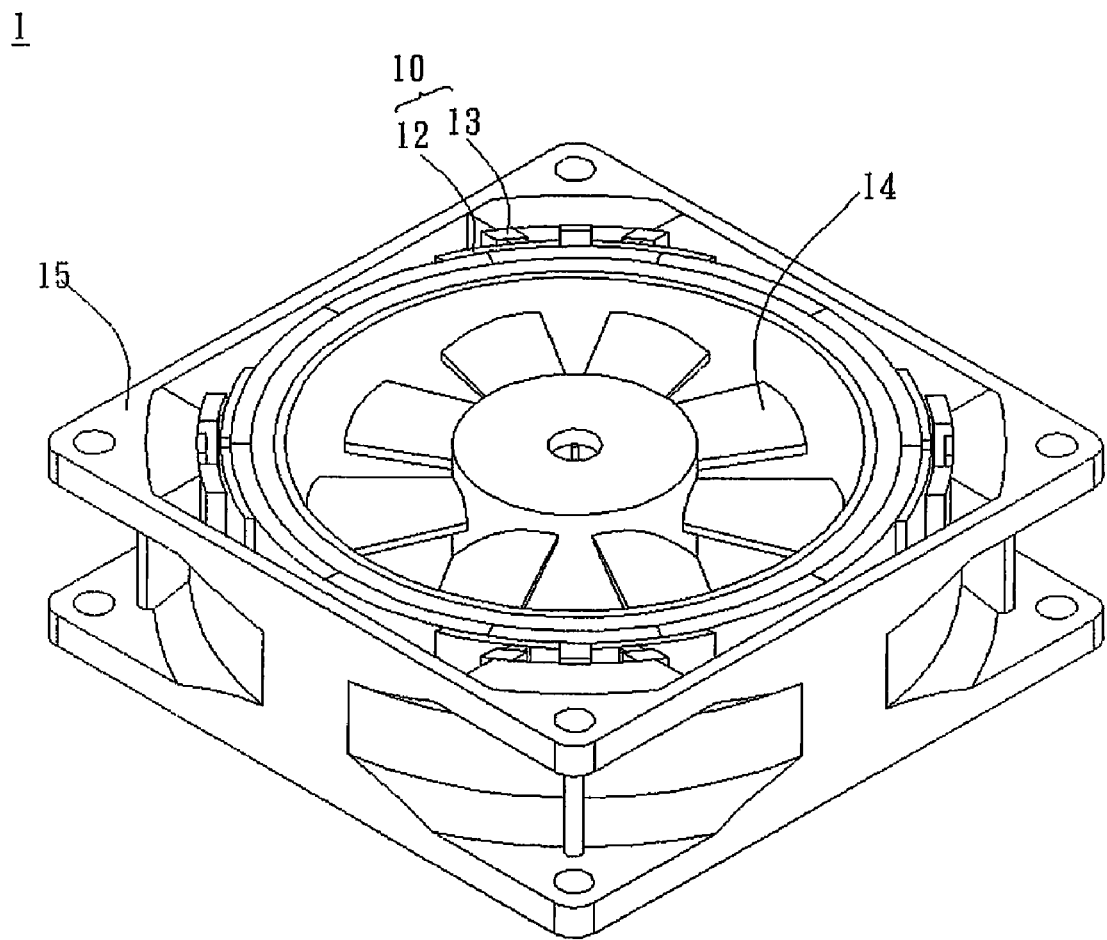
FIG. 1 is a schematic illustration showing a conventional fan.
Figure 2A:
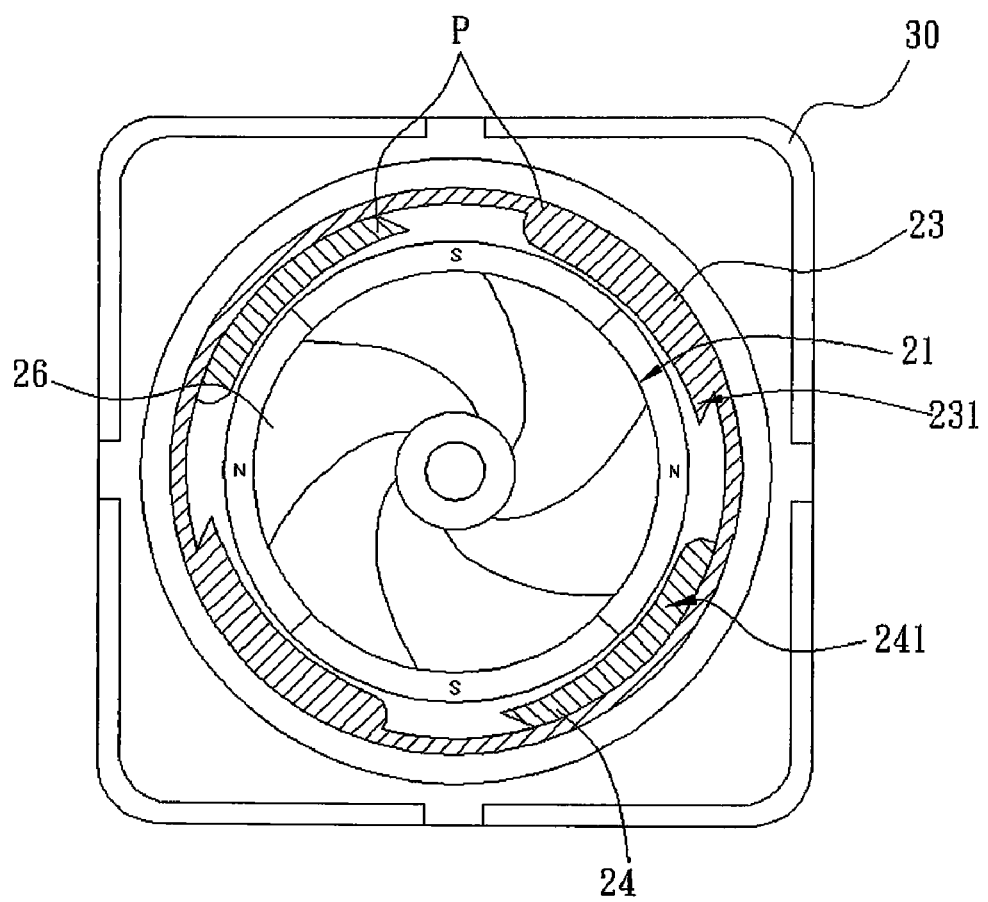
FIG. 2A is a schematic illustration showing a fan according to an embodiment of the present invention
Figure 2B:
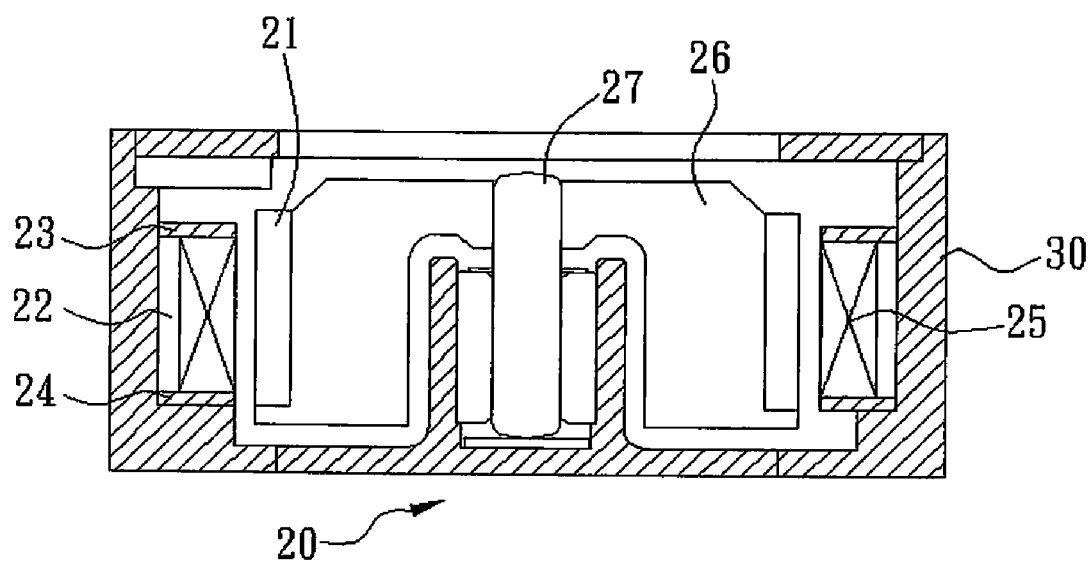
FIG. 2B is a sectional illustration of the fan shown in the FIG. 2A.

Referring to FIGS. 2A and 2B, a fan 2 according to an embodiment of the present invention includes a frame 30, a motor 20 and a plurality of blades 26. The motor 20 is an inner rotor motor and disposed in the frame 30. The motor 20 includes a rotor magnetic ring 21, a stator core 22, a first magnetic conducting sheet 23, a second magnetic conducting sheet 24 and a winding 25. In practice, the first magnetic conducting sheet 23 or the second magnetic conducting sheet 24 can be a silicon steel sheet. The stator of the motor 20 is constructed from the stator core 22, the first magnetic conducting sheet 23, the second magnetic conducting sheet 24 and the winding 25.

Figure 3:
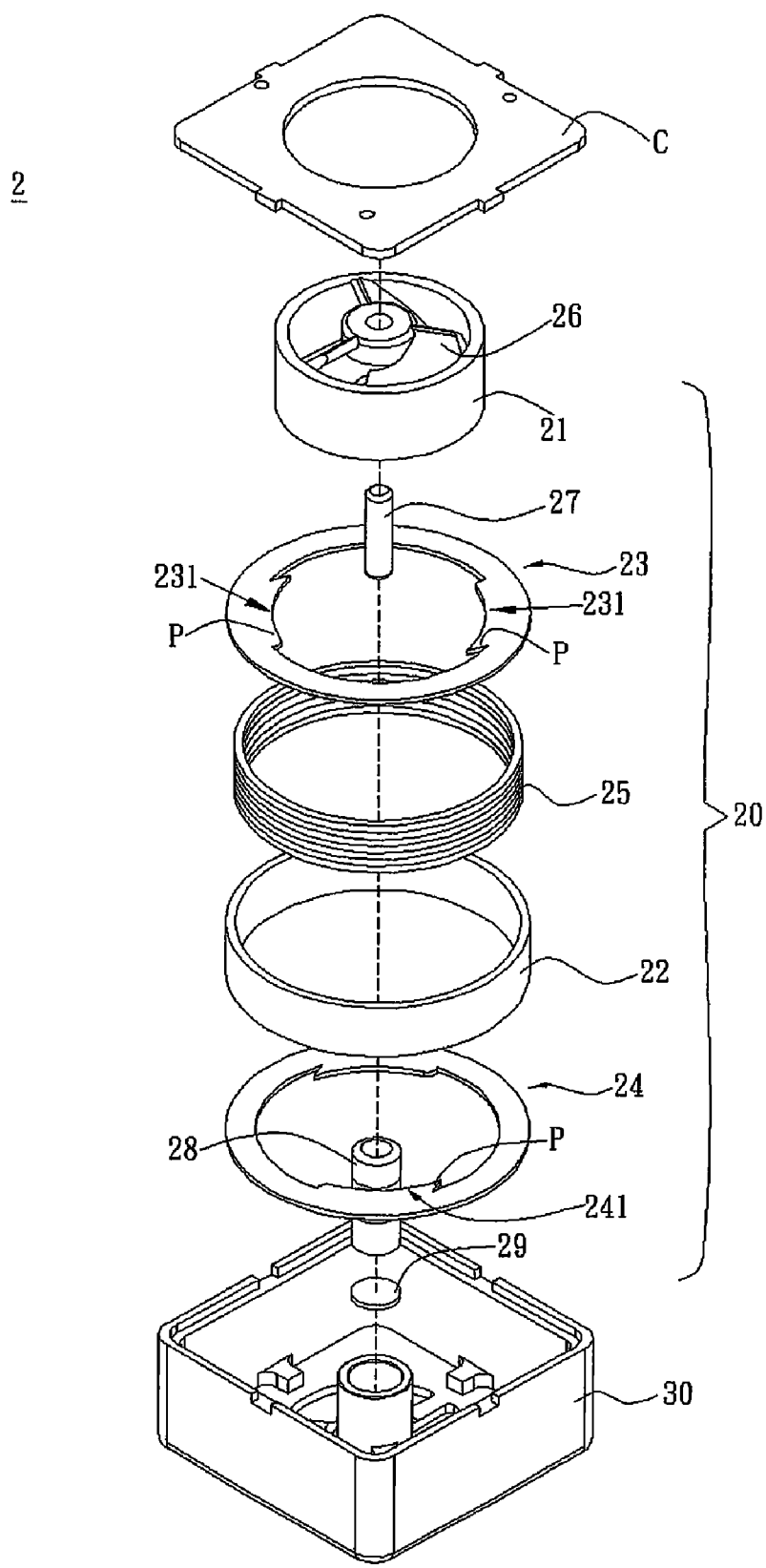
FIG. 3 is an exploded schematic illustration of the fan shown in FIG. 2A.

Referring to FIG. 2B and FIG. 3, the stator core 22 is a magnetic conducting yoke and comprises iron, and the stator core 22 is disposed around and out of the rotor magnetic ring 21. The winding 25 can be disposed at the inner side or the outer side of the stator core 22. In this embodiment, the winding 25 is disposed in the inner side of the stator core 22 and is wound as a concentric circle with respect to the axle of the rotor magnetic ring 21.

The first magnetic conducting sheet 23 has a ring shape and the first magnetic conducting sheet 23 is disposed at the upper side of the stator core 22. The first magnetic conducting sheet 23 has at least one protruding portion P serving as a first magnetic pole 231. In this embodiment, the first magnetic conducting sheet 23 has two first magnetic poles 231, and two ends of each protruding portion P are geometrically non-symmetrical. Such as one end of the protruding portion P is a larger end and the other end of the protruding portion P is a smaller end.

The second magnetic conducting sheet 24 also have a ring shape and is disposed at the lower side of the stator core 22. The second magnetic conducting sheet 24 has at least one protruding portion P serving as a second magnetic pole 241. In this embodiment, the second magnetic conducting sheet 24 has two second magnetic poles 241, and two ends of each protruding portion P are geometrically non-symmetrical.

Referring to FIG. 2B, it is noted that the direction from the upper side to the lower side of the stator core 22 is roughly perpendicular to the winding direction of the winding 25. In FIG. 2A, the ring-shaped portion of the second magnetic conducting sheet 24 is overlapped with and disposed underneath the first magnetic conducting sheet 23, so that the ring-shaped portion of the second magnetic conducting sheet 24 is not shown in FIG. 2A. In addition, the projections of the first magnetic poles 231 and the second magnetic poles 241 alternate with each other, so that the protruding portions of the second magnetic conducting sheet 24, which serve as the second magnetic poles 241, as shown in FIG. 2A.

Referring to FIG. 2B, the motor 20 further includes a rotor composed of a shaft 27 and the rotor magnetic ring 21. The rotor magnetic ring 21 is ring-shaped and is disposed inside the stator composed of the stator core 22, the first magnetic conducting sheet 23, the second magnetic conducting sheet 24 and the winding 25. Moreover, the blades 26 are connected to the inner side of the rotor magnetic ring 21. The material of the rotor magnetic ring 21 may include plastic and magnetizable materials, and the rotor magnetic ring 21 can be formed by injection molding. The material of the blades 26 includes plastic, and the blades 26 can also be formed by injection molding. Moreover, the rotor magnetic ring 21 and the blades 26 can be made of the same material by injection molding together. Or, the shaft 27, the blades 26 and the rotor magnetic ring 21 can be formed by ways of insert molding.

In this embodiment, the rotor magnetic ring 21 and the blades 26 are formed by injection molding firstly, and then the rotor magnetic ring 21 is magnetized to generate a magnetic field so as to form the N poles and the S poles. Thus, when the motor is supplied with electric power and an electric current is supplied to the winding 25, the winding 25 will cause the change in magnetic flux to induce each protruding portion P of the first magnetic conducting sheet 23 and the second magnetic conducting sheet 24 to serve as the first magnetic poles 231 and the second magnetic poles 241.

With reference to FIG. 3, the assembly method and working principle of the fan 2 will be described as following. Firstly, a washer 29 and a bearing 28 are disposed in a sleeve of the frame 30. Next, the stator composed of the stator core 22, the first magnetic conducting sheet 23 and the second magnetic conducting sheet 24, and the rotor composed of the shaft 27 and the rotor magnetic ring 21 are disposed in the sleeve of the frame 30 in proper order. Finally, a printed circuit board C is disposed to cover the frame, i.e., the circuit board and the frame are combined to form a frame cover, and thus the assembly of the fan 2 is finished. Herein, the printed circuit board C may includes a Hall element or a driver IC, and the stator core 22 can be a magnetic conducting yoke.

When electric currents are supplied to the winding 25 and the motor 20 is driven to start, the winding 25 will cause the change in magnetic flux to induce each protruding portion P of the first magnetic conducting sheet 23 and the second magnetic conducting sheet 24 to serve as the first magnetic poles 231 and the second magnetic poles 241. Next, a magnetic field generated by the first magnetic poles 231 and the second magnetic poles 241 will act on the rotor magnetic ring 21 so as to drive the rotor magnetic ring 21, the shaft 27 and the blades 25 to rotate. In addition, two ends of each protruding portion P are geometrically non-symmetrical, so that the starting dead point of the motor 20 will not occur when the motor 20 is switching on.

In summary, the fan and motor thereof according to the present invention have the following features. The winding is disposed at the inner side or the outer side of the stator core. The first magnetic conducting sheet and the second magnetic conducting sheet are disposed at two sides of the stator core, respectively. Also, the projections of the magnetic poles of the first and second magnetic conducting sheets alternate with each other. Moreover, the rotor magnetic ring and the blades can be formed by injection molding and disposed in the stator core, so as to form an inner-rotor motor to drive the fan to rotate. Compared with the prior art, the present invention changes the positions of magnetic poles and winding method of the stator, so that the magnetic poles of the stator are disposed at different planes, respectively, and the projections of the magnetic poles alternate with each other. Thus, the area for accommodating the blades is increased and the occupied area of the stator is decreased, and the space of the frame can be used efficiently. In addition, the winding method for the windings is simplified, the winding time is decreased, so as to decrease the assembly time and the manufacturing cost.

Although the present invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the present invention.

What is claimed is:

1. A motor, comprising:
   a rotor magnetic ring;
   a stator core disposed around and out of the rotor magnetic ring, wherein the stator core has an upper side and a lower side disposed corresponding to each other;
   a first annular magnetic conducting sheet disposed at the upper side of the stator core and comprising with at least one protruding portion radially extending from an edge of the first annular magnetic conducting sheet and serving as a first magnetic pole; and
   a second annular magnetic conducting sheet disposed at the lower side of the stator core and comprising with a protruding portion radially extending from an edge of the second annular magnetic conducting sheet and serving as a second magnetic pole,
   wherein projections of the first magnetic pole and the second magnetic pole alternate with each other.

2. The motor according to claim 1, further comprising:
a winding disposed at an inner side or an outer side of the stator core, wherein the winding is wound as a concentric circle with respect to an axle of the rotor magnetic ring.

3. The motor according to claim 1, wherein the rotor magnetic ring comprises a plastic material and a magnetizable material.

4. The motor according to claim 1, wherein the rotor magnetic ring is formed by injection molding.

5. The motor according to claim 4, wherein the rotor magnetic ring is magnetized to generate a magnetic field after the rotor magnetic ring is formed by injection molding.

6. The motor according to claim 1, wherein at least one blade is disposed inside the rotor magnetic ring.

7. The motor according to claim 6, wherein the blade and the rotor magnetic ring are formed as a single piece and are unitary in construction.

8. The motor according to claim 6, wherein the blade and the rotor magnetic ring are formed by insert molding.

9. The motor according to claim 1, wherein two ends of the protruding portion of the first annular magnetic conducting sheet are geometrically non-symmetrical, and/or two ends of the protruding portion of the second annular magnetic conducting sheet are geometrically non-symmetrical.

10. The motor according to claim 1, wherein the stator core is a magnetic conducting yoke, and the stator core comprises iron.

11. A fan, comprising:
a frame;
a motor disposed in the frame, and the motor comprising:
a rotor magnetic ring,
a stator core disposed around and out of the rotor magnetic ring, wherein the stator core has an upper side and a lower side disposed corresponding to each other,
a first magnetic conducting sheet disposed at the upper side of the stator core and comprising a ring shape with a protruding portion serving as a first magnetic pole, and
a second magnetic conducting sheet disposed at the lower side of the stator core and comprising a ring shape with at least one protruding portion serving as a second magnetic pole, wherein projections of the first magnetic pole and the second magnetic pole alternate with each other; and
a plurality of blades directly connected to an inner side of the rotor magnetic ring of the motor.

12. The fan according to claim 11, wherein the motor further comprises a winding disposed at an inner side or an outer side of the stator core, and the winding is wound as a concentric circle with respect to an axle of the rotor magnetic ring.

13. The fan according to claim 11, wherein the fan further comprises a circuit board, the circuit board includes a Hall element or a driver IC, and the circuit board and the frame are combined to form a frame cover.

14. The fan according to claim 11, wherein the rotor magnetic ring comprises a plastic material and a magnetizable material.

15. The fan according to claim 11, wherein the blades and the rotor magnetic ring are formed as a single piece and are unitary in construction.

16. The fan according to claim 11, wherein the rotor magnetic ring is magnetized to generate a magnetic field after the rotor magnetic ring is formed.

17. The fan according to claim 11, wherein the fan further comprises a shaft, and the shaft, the blades and the rotor magnetic ring are formed as a single piece and are unitary in construction.

18. The fan according to claim 11, wherein two ends of the protruding portion of the first magnetic conducting sheet are geometrically non-symmetrical, and/or two ends of the protruding portion of the second magnetic conducting sheet are geometrically non-symmetrical.

19. The fan according to claim 11, wherein the stator core is a magnetic conducting yoke, and the stator core comprises iron.

20. The fan according to claim 11, wherein the fan further comprises a washer and a bearing disposed in a sleeve of the frame.

* * * * *